(No Model.)
R. E. POINDEXTER.
SAW HANDLE.
No. 345,648. Patented July 13, 1886.
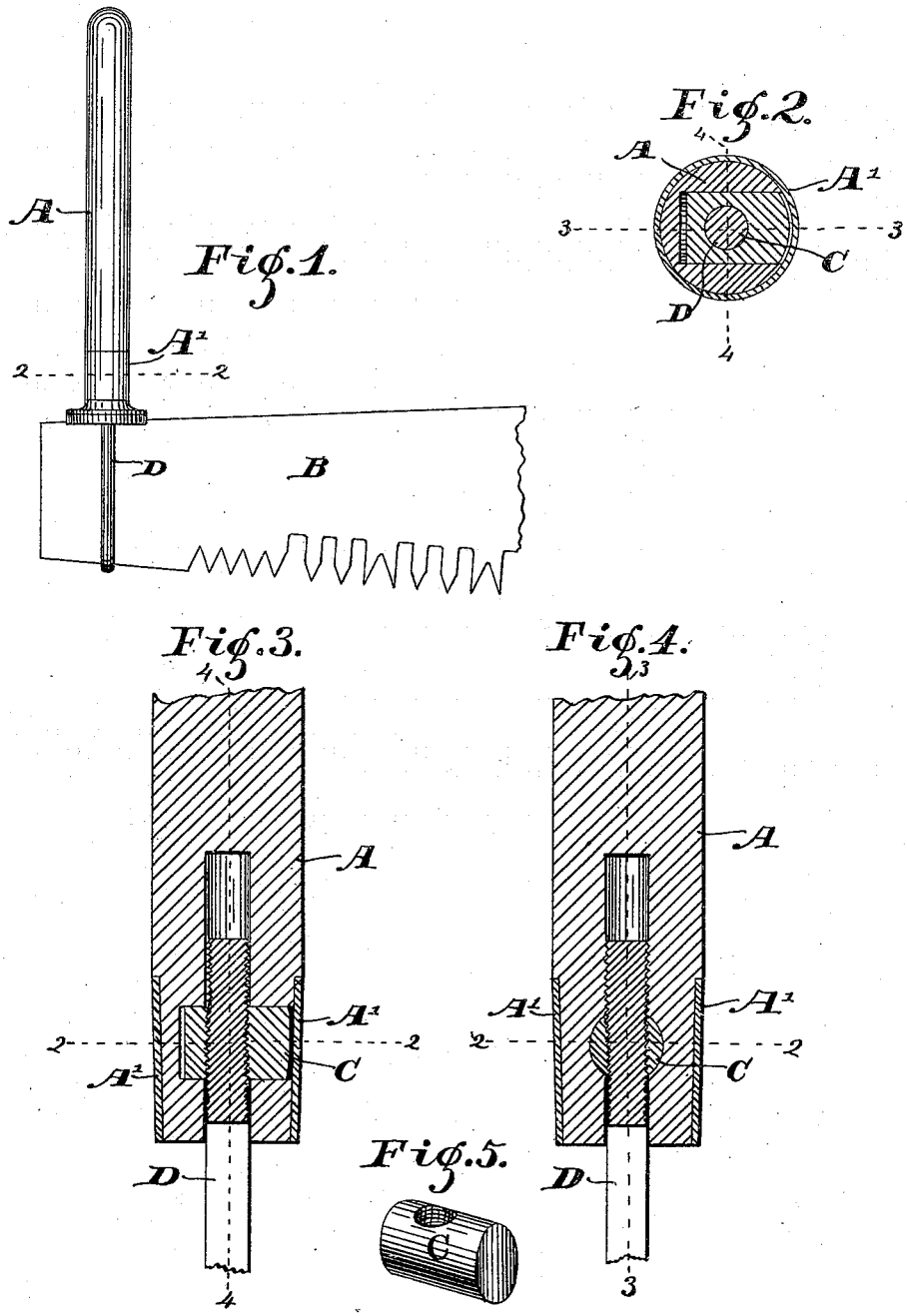
WITNESSES.
Chas N. Leonard.
E. W. Bradford
INVENTOR.
Robert E. Poindexter,
PER
C. Bradford,
ATTORNEY.

UNITED STATES PATENT OFFICE.

ROBERT E. POINDEXTER, OF INDIANAPOLIS, INDIANA.

SAW-HANDLE.

SPECIFICATION forming part of Letters Patent No. 345,648, dated July 13, 1886.

Application filed February 19, 1886. Serial No. 192,570. (No model.)

*To all whom it may concern:*

Be it known that I, ROBERT E. POINDEXTER, of the city of Indianapolis, county of Marion, and State of Indiana, have invented certain new and useful Improvements in Nuts for Handles, &c., of which the following is a specification.

My said invention relates to handles or such like articles, (especially saw-handles, as shown;) and it consists in the formation and manner of placing the nut in position by which the strap or clip which surrounds or is secured to the end of the saw or other article is held, as will be hereinafter more particularly described and claimed.

Referring to the accompanying drawings, which are made a part hereof, and on which similar letters of reference indicate similar parts, Figure 1 is a side elevation of a portion of a crosscut-saw provided with a handle embodying my invention; Fig. 2, a horizontal sectional view thereof on the dotted line 2 2; Fig. 3, a longitudinal vertical sectional view on the dotted line 3 3; Fig. 4, a transverse vertical sectional view on the dotted line 4 4, and Fig. 5 a perspective view of the nut separately.

In said drawings, the portions marked A represent the handle; B, the saw; C, the nut, and D the strap. The handle A and saw B are or may be, generally, of the ordinary and well-known form, and need no special description. Said handle A has one round hole bored therein transversely thereof at a point which may afterward be covered by the ferrule A', and another hole bored longitudinally thereof in the ordinary manner. The round hole which is bored transversely thereof preferably does not extend quite through the handle, and is of just sufficient size to receive the nut, as will be hereinafter more fully described.

The ferrule A' is an ordinary ferrule, which covers the end of the handle up to a short distance above the nut. The nut C is in general form a short piece of round metal, with its outer end rounded somewhat to correspond with the contour of the handle. At a point therein which comes in contact with the longitudinal hole in the handle when said nut is placed in position is formed a hole transversely thereof, which is screw-threaded and receives the shank of the saw-strap D. This nut, being formed round, fits closely into the round hole bored transversely of the handle, and thus the handle does not need to be cut away to the same extent as where a square nut (which has been commonly used) is inserted. The nut itself I prefer to cast of malleable iron, and it is thus made very cheaply. When placed in position, it entirely fills the hole formed to receive it, and it is held therein by the ferrule A', and thus the expense and trouble of plugging the outer end of the hole, which has heretofore been necessary, is avoided. When finished and placed in position, the strap D is inserted therein, and it is used and operated in the ordinary and well-known manner.

Having thus fully described my said invention, what I claim as new, and desire to secure by Letters Patent, is—

1. The combination of a handle, A, having a transverse hole extending partly through the same, a nut, C, in the form of a section of round rod having a transverse screw-threaded hole therein, and its end rounded to conform to the contour of the handle, said nut being of a size to completely fill said transverse hole in said handle, and a ferrule which covers the lower end of said handle and holds said nut in position, substantially as set forth.

2. The combination of a handle having a transverse aperture therein, a nut round in cross-section, and having a transverse screw-threaded hole to engage the tang of a tool, said nut being mounted in the aperture in said handle, and a ferrule covering the end of said aperture, all substantially as set forth.

In witness whereof I have hereunto set my hand and seal, at Indianapolis, Indiana, this 24th day of September, A. D. 1885.

ROBERT E. POINDEXTER. [L. S.]

In presence of—
C. BRADFORD,
E. W. BRADFORD.